United States Patent
Huck et al.

(10) Patent No.: US 9,496,764 B2
(45) Date of Patent: Nov. 15, 2016

(54) BRUSH HOLDER FOR AN ELECTRIC MOTOR, AND GEAR MECHANISM DRIVE UNIT HAVING A BRUSH HOLDER

(71) Applicant: Robert Bosch GmbH, Stuttgart (DE)

(72) Inventors: Thomas Huck, Rheimuenster (DE); Hanspeter Keller, Karslruhe (DE); Peter Bohr, Karlsruhe (DE); Tarek Mili, Lauterbourg (FR)

(73) Assignee: Robert Bosch GmbH, Stuttgart (DE)

( * ) Notice: Subject to any disclaimer, the term of this patent is extended or adjusted under 35 U.S.C. 154(b) by 301 days.

(21) Appl. No.: 14/186,240

(22) Filed: Feb. 21, 2014

(65) Prior Publication Data

US 2014/0232213 A1    Aug. 21, 2014

(30) Foreign Application Priority Data

Feb. 21, 2013  (DE) .................... 10 2013 202 857

(51) Int. Cl.
 H02K 5/14     (2006.01)
 H02K 7/116    (2006.01)

(52) U.S. Cl.
 CPC ............... H02K 5/14 (2013.01); H02K 5/148 (2013.01); H02K 7/116 (2013.01); H02K 11/38 (2016.01)

(58) Field of Classification Search
 USPC ...... 310/227, 229, 244, 251, 252, 71, 87, 88
 See application file for complete search history.

(56) References Cited

U.S. PATENT DOCUMENTS

| 5,382,857 | A | 1/1995 | Schellhorn et al. | |
|---|---|---|---|---|
| 6,903,473 | B2 * | 6/2005 | Matsuyama | G01P 1/026 310/71 |
| 2002/0149283 | A1 * | 10/2002 | Hager | H02K 5/148 310/239 |
| 2004/0012279 | A1 * | 1/2004 | Ursel | G01D 5/145 310/75 R |
| 2004/0201296 | A1 * | 10/2004 | Hama | H01R 39/383 310/71 |
| 2005/0012412 | A1 * | 1/2005 | Buss | H02K 11/38 310/71 |
| 2011/0169370 | A1 * | 7/2011 | Roos | H02K 13/10 310/238 |

FOREIGN PATENT DOCUMENTS

| DE | 10007696 | 8/2001 |
|---|---|---|
| DE | 10246712 | 4/2004 |

\* cited by examiner

*Primary Examiner* — Naishadh Desai

(74) *Attorney, Agent, or Firm* — Michael Best & Friedrich LLP

(57) ABSTRACT

A brush holder (100) for an electric motor (12a; 12b), having a brush holder main body (20) which has a passage opening (25) for an armature shaft to pass through, having a first receiving region (37) for fastening a printed circuit board (35), on which electrical or electronic components are mounted, to the brush holder main body (20), wherein the first receiving region (37) extends as far as into a region between an outer boundary (23, 24) of the brush holder main body (20) and the passage opening (25), and wherein the first receiving region (37) for the printed circuit board (35) is designed to arrange the printed circuit board (35) on the brush holder main body (20) at least substantially perpendicularly to the plane of the brush holder main body (20), and having components (26, 33) which are arranged on the brush holder main body (20) and which are mechanically and/or electrically connected at least indirectly to the printed circuit board (35).

13 Claims, 5 Drawing Sheets

BRUSH HOLDER FOR AN ELECTRIC MOTOR, AND GEAR MECHANISM DRIVE UNIT HAVING A BRUSH HOLDER

BRIEF DESCRIPTION OF THE INVENTION

The invention relates to a brush holder for an electric motor. The invention also relates to a gear mechanism drive unit for a convenience drive in a motor vehicle using a brush holder according to the invention.

A brush holder is known from DE 102 46 712 A1 by the same applicant. The known brush holder is a constituent part of an electric motor and serves, in particular, for arranging carbon brushes which are intended to be arranged with operative connection to a commutator which is arranged on an armature shaft of the electric motor. The known brush holder also has a printed circuit board for electrical or electronic components, wherein the plane of the printed circuit board extends parallel to the axis of the armature shaft or perpendicular to a plane of a brush holder main body. Furthermore, the printed circuit board is arranged in the immediate vicinity of the armature shaft, with the result that Hall elements which are arranged on the printed circuit board can be used to detect the angular position of the armature shaft.

Electric motors of this kind, which are equipped with a brush holder, are constituent parts of window winder drives in motor vehicles, for example. In this case, it is important that drives which may be of different design and which are formed, in particular, with mirror-image symmetry in relation to one another have to be used, depending on whether the window winder drive is installed on the driver side or on the passenger side. The result of this is that different brush holders, which are distinguished by a different arrangement of the components on the brush holder in particular, have to be used depending on the side on which the window winder drive is installed in the vehicle. In addition to the different locations in which the components are mounted, it may also be necessary to mount different components in this case.

SUMMARY OF THE INVENTION

Proceeding from the illustrated prior art, the invention is based on the object of developing a brush holder for an electric motor in such a way that different brush holders can be formed using as large a number of identical components as possible, said identical components allowing the brush holder to be used both in an electric motor which is arranged on the driver side and also in an electric motor which is arranged on the passenger side. According to the invention, this object is achieved in the case of a brush holder for an electric motor in that, in addition to a first receiving region for a printed circuit board, the brush holder main body of the brush holder additionally has a second receiving region for the printed circuit board, in that the second receiving region is arranged on that side of the bushing for the armature shaft which is situated opposite the first receiving region, and in that the brush holder main body allows connection of components to the printed circuit board at the two receiving regions. In other words, this means that, owing to the provision of two receiving regions for the printed circuit board, of which only one of the receiving regions is provided with the printed circuit board, depending on the use of the brush holder on the driver side or passenger side, the brush holder main body is suitable, in principle, for different sites of installation in the electric motor, in particular on a gear mechanism drive unit. In this case, it also appears important that not only two receiving regions are provided for the arrangement of a printed circuit board, but rather that at the same time the brush holder main body is designed or configured in such a way that preferably one and the same components can be connected, at least indirectly, to the printed circuit board at both receiving regions. The invention therefore allows different electric motors or gear mechanism drive units to be realized using one and the same brush holder main body.

In order to minimize the installation space taken up by the brush holder main body, provision is made in a first preferred refinement of the invention for the two receiving regions for the printed circuit board to be arranged symmetrically in relation to a plane of symmetry of the brush holder main body which lies in the longitudinal axis of the bushing. As a result, the same distance between the longitudinal axis of the bushing and the receiving region is always generated, irrespective of the side on which the printed circuit board is located on the brush main body, and therefore the space requirement is minimized.

In order to form a brush holder main body which is as narrow as possible, it is proposed that the two receiving regions are arranged parallel to the plane of symmetry.

A brush holder main body of this kind which is optimized in respect of installation space is required, in particular, when using so-called flat motors of which the motor housing has planar faces on the mutually opposite sides. Said faces are reflected in a corresponding design of the brush holder main body, and therefore it is proposed that the two receiving regions are arranged parallel to the outer boundaries, which are of straight design, in the form of lateral boundary edges of the brush holder main body.

A brush holder main body which is as narrow as possible can furthermore be produced when two carbon guide elements are arranged on the brush holder main body, said carbon guide elements being arranged at an angle of preferably approximately 90° in relation to one another, and when the printed circuit board, which is arranged in one of the receiving regions, extends by way of one end face as far as directly against one of the carbon guide elements. As a result, the physical size in a direction perpendicular to the plane of the printed circuit board is minimized.

In order to allow one and the same brush holder main body to be used with different interfaces of the electric motor, which interfaces are required on account of the different arrangements of the electric motor in relation to a gear mechanism housing of a gear mechanism drive unit, it is further proposed that an electrical connection element is arranged between the two receiving regions of the printed circuit board, said electrical connection element serving to connect the brush holder main body to a connection plug on the vehicle, and that the connection element is arranged in the plane of symmetry of the brush holder main body.

It is very particularly preferred when the brush holder main body has two subregions which are formed symmetrically in relation to the axis of symmetry. A design of this kind means that, in particular, the two subregions each allow receiving options of identical design and arrangement for one and the same components in the two subregions.

The brush holder according to the invention is used, in particular, in gear mechanism drive units for a convenience drive in a motor vehicle, said brush holder having a gear mechanism housing when used in this way, a drive motor having a brush holder being fastened to said gear mechanism housing, wherein different installation positions of the drive motor on the gear mechanism housing, as is necessary in the case of window winder drives, are made possible on account of the brush holder being designed according to the invention.

BRIEF DESCRIPTION OF THE DRAWINGS

Further advantages, features and details of the invention can be found in the following description of preferred exemplary embodiments and also with reference to the drawing.

In the drawing.

Identical elements or elements with the same function are provided with the same reference numerals in the figures.

DETAILED DESCRIPTION

Figure 1:
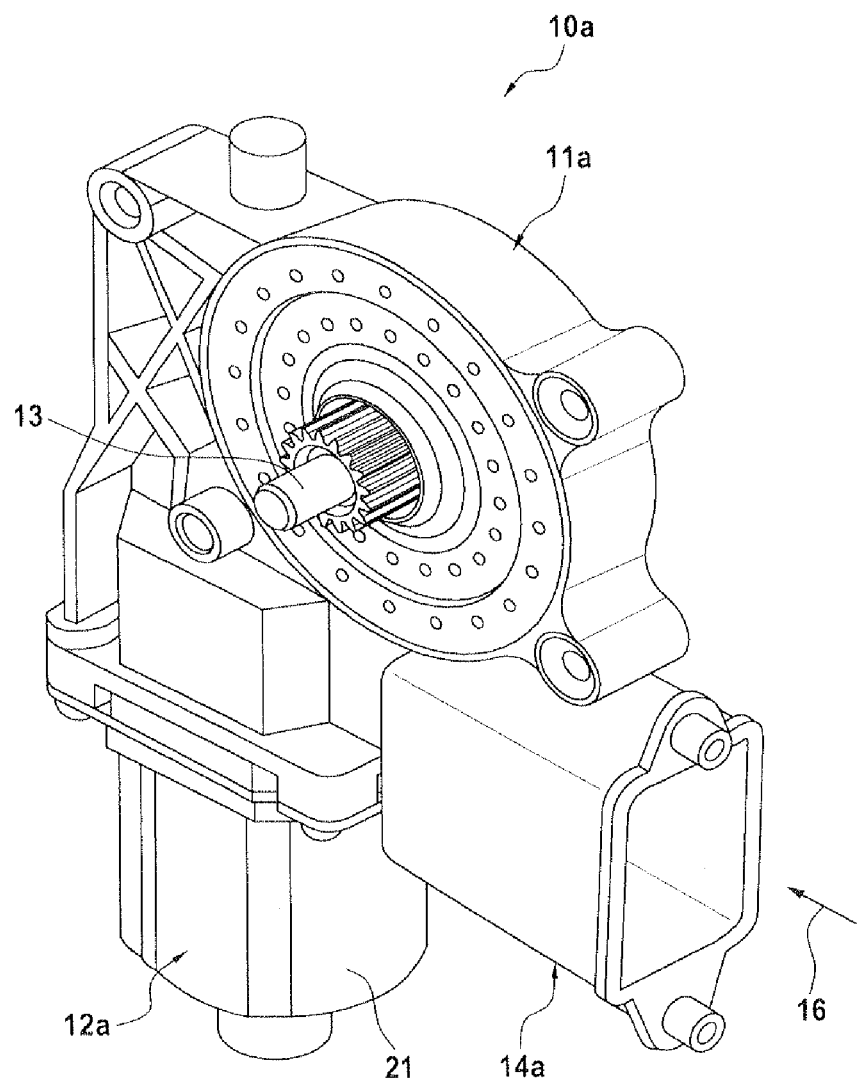
FIGS. 1 and 2 each show a perspective illustration of a window winder motor for a motor vehicle for installation on a driver side and, respectively, a passenger side.
Figure 2:
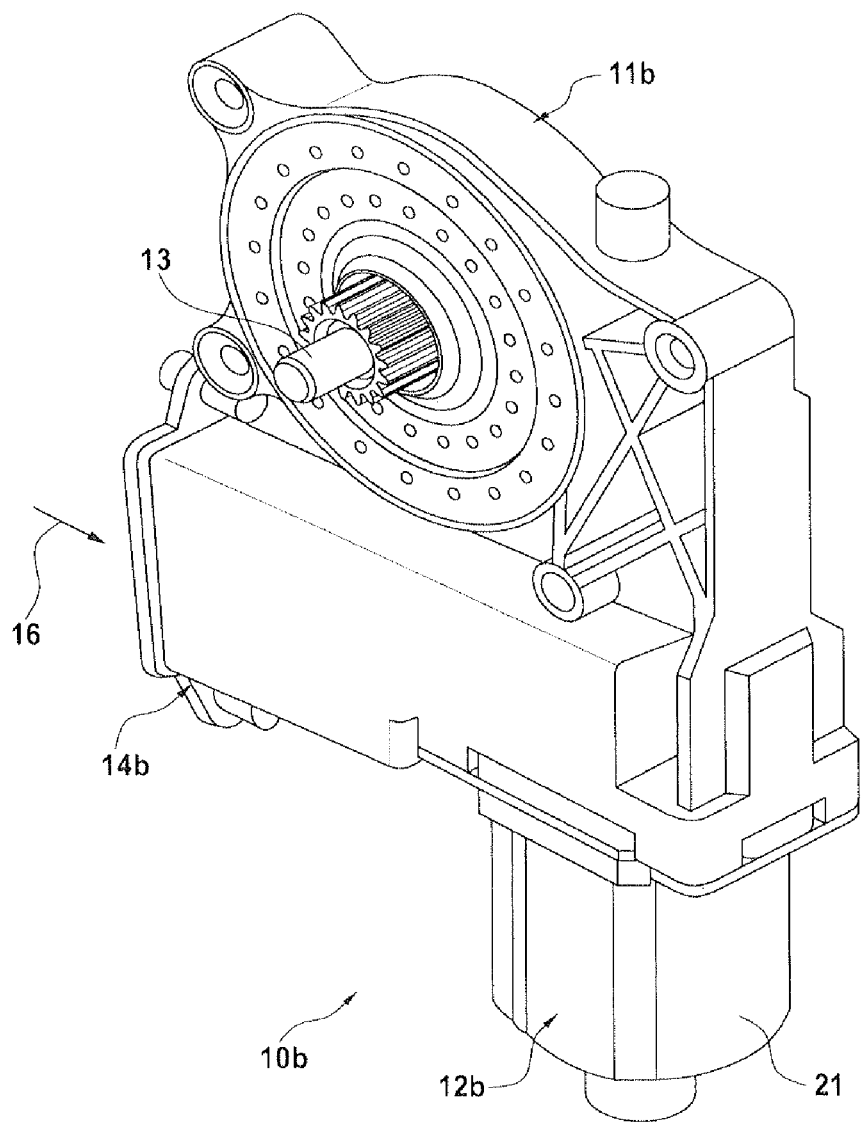

FIGS. 1 and 2 show a gear mechanism drive unit 10*a*, 10*b* as is used as a convenience drive in a motor vehicle. The gear mechanism drive unit 10*a*, 10*b* is in the form of a window winder drive, wherein the gear mechanism drive unit 10*a* is arranged (by way of example) on the driver side of the motor vehicle, whereas the gear mechanism drive unit 10*b* is arranged on the passenger side. The gear mechanism drive unit 10*a*, 10*b* in each case comprises a gear mechanism housing 11*a*, 11*b*, and also a drive motor 12*a*, 12*b* which is in the form of an electric motor and is flange-connected to the respective gear mechanism housing 11*a*, 11*b*. A drive shaft 13 projects out of the gear mechanism housing 11*a*, 11*b* in each case, said drive shaft serving to at least indirectly operate an element, in particular a window pane, which is to be adjusted. In this case, it is important that the drive shaft 13 projects toward the outside of the motor vehicle, for example in each case with respect to the driver or passenger door.

In order to be able to form or use identical installation spaces for accommodating the gear mechanism drive unit 10*a*, 10*b* within the respective driver door or passenger door, it is therefore necessary for gear mechanism housings 11*a* 11*b* of mirror-image design to be used. Furthermore, a plug connection 14*a*, 14*b* is in each case arranged on that gear mechanism housing 11*a*, 11*b* by means of which electrical contact is made with the gear mechanism drive unit 10*a*, 10*b* or the drive motor 12*a*, 12*b* or said gear mechanism drive unit or said drive motor is driven. To this end, a connection plug (not illustrated) on the vehicle is connected to the plug connection 14*a*, 14*b* in the direction of the arrow 16.

The mirror-image design of the two gear mechanism drive units 10*a*, 10*b* leads to the brush holder 100 according to the invention, which is used in the drive motor 12*a*, 12*b*, requiring a different arrangement of the components which are arranged on the brush holder 100.

Figure 3:
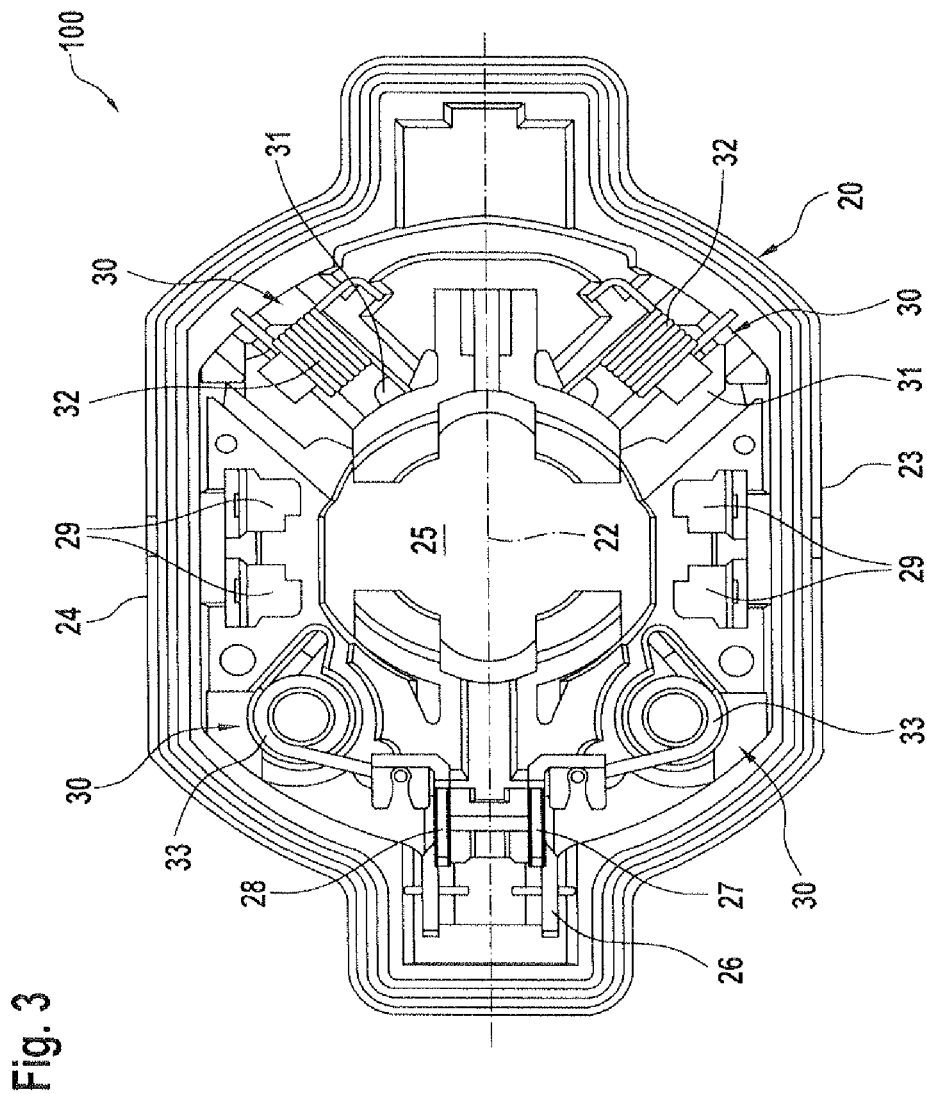
FIG. 3 shows a plan view of a brush holder, which is used in a window winder motor according to FIGS. 1 and 2, as a constituent part of an electric motor, and FIGS. 4 and 5 each show a plan view of a brush holder main body, as is used in the window winder motors which are illustrated in FIGS. 1 and 2.

As shown with reference to FIG. 3, a brush holder 100 according to the invention comprises a brush holder main body 20 which is composed of plastic and is in the form of an injection-molded part. The brush holder main body 20 has, depending on the external shape of the motor housing 21 of the drive motor 12*a*, 12*b*, a plane 22 of symmetry (perpendicular to the plane of the drawing of FIG. 3) with side edges 23, 24 which run parallel to said plane of symmetry and form outer boundaries of the brush holder main body 20. This is therefore necessary since, as shown with reference to FIGS. 1 and 2 in particular, the drive motor 12*a*, 12*b* is formed with a so-called flat construction with planar side faces, and the brush holder main body 20 is intended to be arranged within the contour of the motor housing 21, in order to achieve a construction which is as compact as possible.

The brush holder main body 20 has a passage opening 25 for an armature shaft, which is not illustrated in the figures, to pass through, that end of said armature shaft which projects out of the motor housing 21 or out of the drive motor 12*a*,12*b* projecting into the gear mechanism housing 11*a*, 11*b* in order to there drive a gearwheel of a step-down gear mechanism, said gearwheel being arranged within the gear mechanism housing 11*a*, 11*b* and at least indirectly driving the drive shaft 13. A plug connection element 26, which is in the form of a stamped-and-bent part and has two contact lugs 27, 28 which are in the form of flat plugs and which serve to make electrical contact with the gear mechanism drive unit 10*a*, 10*b* by means of the connection plug on the vehicle, is shown with reference to FIG. 3. On one side of the brush holder main body 20, the plug connection element 26 is arranged symmetrically in relation to and in the plane 22 of symmetry. Furthermore, the brush holder main body 20 has receiving spaces 29, 30, which are each arranged symmetrically in relation to the plane 22 of symmetry, for receiving or fastening, for example, sleeve-like carbon guide elements 31 for carbon brushes, which are not illustrated, and springs 32 which interact with the carbon brushes or interference-suppression coils 33.

Figure 4:
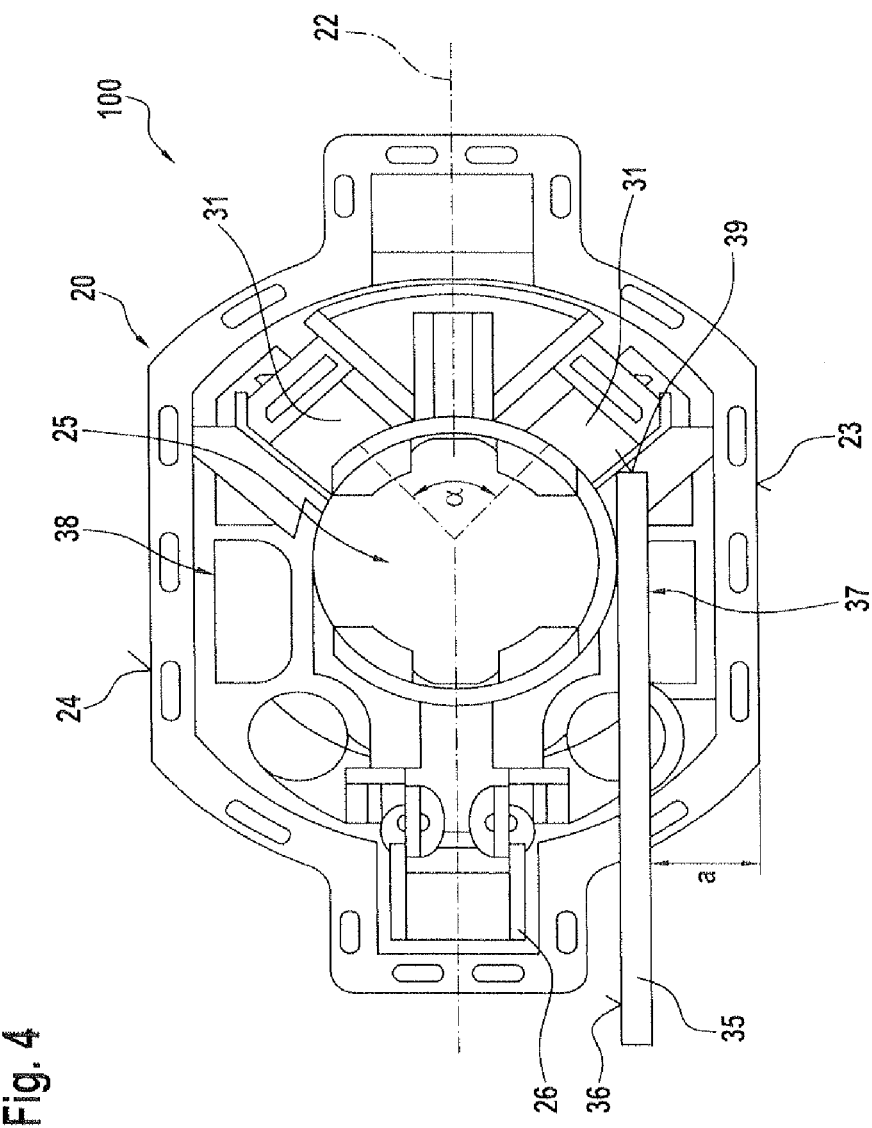
Figure 5:
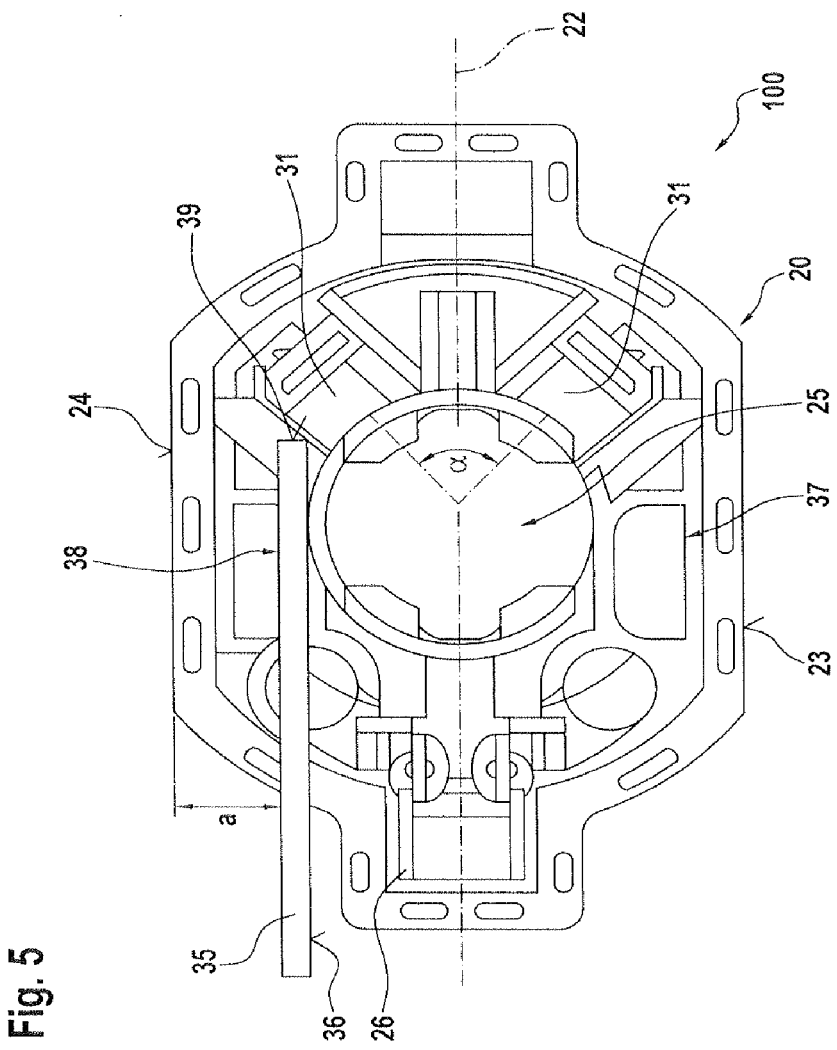

It is also important that a printed circuit board 35 which is shown in FIGS. 4 and 5 is used for arranging and/or fastening further components of the brush holder 100 which are not illustrated in detail, said printed circuit board being arranged perpendicularly to the plane of the brush holder main body 20, that is to say that the plane 36 of said printed circuit board runs parallel to a plane of symmetry which extends perpendicularly to the plane of the drawing of FIGS. 3 to 5 in the plane 22 of symmetry, wherein the plane 22 of symmetry is arranged centrally in relation to the longitudinal axis of the passage opening 25 or to the armature shaft which is arranged in the passage opening 25. The plane 36 of the printed circuit board or the printed circuit board 35 is arranged on different sides of the plane 22 of symmetry depending on whether the printed circuit board 35 is used in a gear mechanism drive unit 10*a* or in a gear mechanism drive unit 10*b*.

As shown with reference to FIGS. 4 and 5 in particular, the brush holder main body 20 has, for this purpose, a first receiving region 37 and a second receiving region 38 for receiving the printed circuit board 35 on one or the other side of the plane 22 of symmetry, for example by means of a latching, solder, adhesive-bonding connection or the like. In this case, the printed circuit board 35 is in each case parallel and at the same distance a from the respectively closer side edge 23 or 24 of the brush holder main body 20.

The two receiving spaces 29, 30 or the carbon guide elements 31 are arranged on that side of the passage opening 25 which is situated opposite the plug connection element 26 and form an angle α of, for example, 90°. As shown by looking at FIGS. 4 and 5 together, the printed circuit board 35 which is arranged on one of the receiving regions 37, 38 projects by way of one end face 39 as far as directly against the carbon guide elements 31. Furthermore, it is important for the invention that the components which are arranged on the brush holder main body 20 and are arranged with operative connection to the printed circuit board 35 can be connected to the printed circuit board 35 irrespective of which of the two receiving regions 37, 38 contains the printed circuit board 35. The receiving spaces 29, 30 which are arranged, in particular, with mirror-image symmetry in relation to the plane 22 of symmetry are used for this purpose.

The brush holder 100 which has been described up to this point can be altered or modified in various ways without departing from the concept of the invention. This involves designing a brush holder main body 20 in such a way that it forms two receiving regions 37, 38 for receiving a printed circuit board 35, which receiving regions are arranged with mirror-image symmetry in relation to a plane 22 of symmetry of the brush holder main body 20 in order to configure a brush holder 100, using components which are identical as far as possible, such that said brush holder can be used both in a drive motor 12a which is suitable for use in a gear mechanism drive unit 10a on the driver side and also in a drive motor 12b in a gear mechanism drive unit 10b, as serves for use on a passenger side of a motor vehicle. To this end, the brush holder main body 20 has substantially two subregions which are formed symmetrically in relation to the plane 22 of symmetry.

What is claimed is:

1. A brush holder (100) for an electric motor (12a; 12b), having a brush holder main body (20) which has a passage opening (25) for an armature shaft to pass through, having a first receiving region (37) for receiving and fastening a printed circuit board (35) in a first position, on which electrical or electronic components are mounted, to the brush holder main body (20), wherein the first receiving region (37) extends as far as into a region between a first outer boundary (23) of the brush holder main body (20) and the passage opening (25), and wherein the first receiving region (37) for the printed circuit board (35) is configured to arrange the printed circuit board (35) on the brush holder main body (20) at least substantially perpendicularly to the plane of the brush holder main body (20), and having components (26, 33) which are arranged on the brush holder main body (20) and which are mechanically and/or electrically connected at least indirectly to the printed circuit board (35), wherein the brush holder main body (20) has a second receiving region (38) for receiving and fastening the printed circuit board (35) in a second position, wherein the second receiving region (38) is arranged on that side of the passage opening (25) which is situated opposite the first receiving region (37) between a second outer boundary (24) of the brush holder main body (20) and the passage opening (25), wherein the brush holder main body (20) has receiving spaces (29, 30) for the components (26, 33), which receiving spaces allow at least indirect connection of the components (26, 33) to the printed circuit board (35) at the first and second receiving regions (37, 38), wherein the first and the second receiving regions (37, 38) are arranged symmetrically in relation to a plane (22) of symmetry of the brush holder main body (20) which lies in the longitudinal axis of the passage bore (25), wherein the first and second receiving regions (37, 38) are arranged approximately parallel to the first and second outer boundaries (23, 24), and wherein the first and second outer boundaries (23, 24) are flat lateral boundary edges of the brush holder main body (20), corresponding to an outer shape of a motor housing 21 of the electric motor (12a; 12b).

2. The brush holder according to claim 1, wherein two carbon guide elements (31) are arranged on the brush holder main body (20), said carbon guide elements being arranged at an angle ($\alpha$) of approximately 90° in relation to one another, and in that the printed circuit board (35), which is arranged in one of the first and second receiving regions (37, 38), extends by way of one end face (39) as far as directly against one of the carbon guide elements (31).

3. The brush holder according to claim 1, wherein an electrical connection element (26) is arranged between the first and second receiving regions (37, 38), said electrical connection element serving to connect the brush holder main body (20) to a connection plug on the vehicle, and in that the connection element (26) is arranged in the plane (22) of symmetry of the brush holder main body (22).

4. The brush holder according to claim 1, characterized in that the brush holder main body (20) is composed of plastic and is in the form of an injection-molded part.

5. A gear mechanism drive unit (10a; 10b) for a convenience drive in a motor vehicle, having a gear mechanism housing (11a; 11b) to which a drive motor (12a; 12b) having a brush holder (100) according to claim 1 is fastened.

6. The gear mechanism drive unit (10a; 10b) according to claim 5, characterized in that an electronics housing (14a, 14b) is integrated on the gear mechanism housing (11a; 11b), such that the printed circuit board (35) can be inserted into said electronics housing.

7. The gear mechanism drive unit (10a; 10b) according to claim 5, wherein the printed circuit board (35) can be inserted radially in relation to the armature shaft, wherein Hall sensors are arranged on the printed circuit board (35), said Hall sensors interacting with a transmitter magnet, which is arranged on a rotor shaft (13) of the gear mechanism drive unit (10; 10b), in order to detect the position of the rotor shaft (13) when the printed circuit board (35) is in the inserted state.

8. The gear mechanism drive unit (10a; 10b) according to claim 5, wherein the printed circuit board (35) is inserted into the first receiving region (37) or the second receiving region (38) after the brush holder main body is completely mounted between the drive motor (12a, 12b) and the gear mechanism housing (11a, 11b).

9. The brush holder according to claim 1, wherein two carbon guide elements (31) are arranged on the brush holder main body (20), said carbon guide elements being arranged at an angle ($\alpha$) approximately 90° in relation to one another, and in that the printed circuit board (35), which is arranged in one of the first and second receiving regions (37, 38), extends by way of one end face (39) as far as directly against one of the carbon guide elements (31), wherein the carbon guide elements (31) are arranged approximately symmetrically to the plane (22) of symmetry.

10. The brush holder according to claim 1, wherein an electrical connection element (26) is arranged between the first and second receiving regions (37, 38), said electrical connection element serving to connect the brush holder main body (20) to a connection plug on the vehicle, and in that the connection element (26) is arranged in the plane (22) of symmetry of the brush holder main body (22), wherein the connection element (26) will be electrically connected to the motor current contacts which are arranged on the printed circuit board (35) when said printed circuit board is inserted.

11. The gear mechanism drive unit (10a; 10b) according to claim 5, characterized in that an electronics housing (14a, 14b) is integrated on the gear mechanism housing (11a; 11b), such that the printed circuit board (35) can be inserted into said electronics housing tangentially to the passage opening (25) in the brush holder main body (20).

12. A brush holder (100) for an electric motor (12a; 12b), having a brush holder main body (20) which has a passage opening (25) for an armature shaft to pass through, having a first receiving region (37) for fastening a printed circuit board (35), on which electrical or electronic components are mounted, to the brush holder main body (20), wherein the first receiving region (37) extends as far as into a region between an outer boundary (23, 24) of the brush holder main body (20) and the passage opening (25), and wherein the first receiving region (37) for the printed circuit board (35) is configured to arrange the printed circuit board (35) on the brush holder main body (20) at least substantially perpendicularly to the plane of the brush holder main body (20), and having components (26, 33) which are arranged on the brush holder main body (20) and which are mechanically and/or electrically connected at least indirectly to the printed circuit board (35), wherein the brush holder main body (20) has a second receiving region (38) for the printed circuit board (35), wherein the second receiving region (38) is arranged on that side of the passage opening (25) which is situated opposite the first receiving region (37), wherein the brush holder main body (20) has receiving spaces (29, 30) for the components (26, 33), which receiving spaces allow at least indirect connection of the components (26, 33) to the printed circuit board (35) at the first and second receiving regions (37, 38), and wherein two carbon guide elements (31) are arranged on the brush holder main body (20), said carbon guide elements being arranged at an angle ($\alpha$) of approximately 90° in relation to one another, and in that the printed circuit board (35), which is arranged in one of the first and second receiving regions (37, 38), extends by way of one end face (39) as far as directly against one of the carbon guide elements (31).

13. The brush holder according to claim 12, wherein the carbon guide elements (31) are arranged approximately symmetrically to the plane (22) of symmetry.

* * * * *